US005263547A

United States Patent [19]

Alber

[11] Patent Number: 5,263,547

[45] Date of Patent: Nov. 23, 1993

[54] STAIRS CLIMBING DEVICE

[75] Inventor: Ulrich Alber, Albstadt-Laufen, Fed. Rep. of Germany

[73] Assignee: Haas & Alber Haustechnik und Apparatebau GmbH, Ebingen, Fed. Rep. of Germany

[21] Appl. No.: 176,025

[22] Filed: Mar. 30, 1988

[30] Foreign Application Priority Data

Apr. 23, 1987 [DE] Fed. Rep. of Germany ....... 3713564

[51] Int. Cl.[5] ................................ B62B 5/02

[52] U.S. Cl. ................................ 180/8.2; 180/907; 180/357; 280/5.28; 280/DIG. 10

[58] Field of Search ...................... 280/5.2, 5.26, 5.28, 280/DIG. 10; 180/8.2, 8.3, 907, 7.1, 65.6, 357; 297/DIG. 4

[56] References Cited

U.S. PATENT DOCUMENTS

| | | | |
|---|---|---|---|
| 2,400,824 | 5/1946 | Jackson | 180/65.6 X |
| 3,304,094 | 2/1967 | Wenger | 280/DIG. 10 X |
| 3,515,401 | 6/1970 | Gross | 280/5.26 |
| 4,457,526 | 7/1984 | Persson | 280/5.26 |
| 4,550,924 | 11/1985 | Alber | 280/5.28 |
| 4,709,773 | 12/1987 | Clement et al. | 280/5.28 X |

FOREIGN PATENT DOCUMENTS

| | | | |
|---|---|---|---|
| 185944 | 6/1956 | Austria | 280/5.28 |
| 877832 | 8/1971 | Canada | 280/5.26 |
| 144896 | 11/1980 | Fed. Rep. of Germany | 280/5.2 |
| 44933 | 3/1975 | Japan | 280/5.28 |
| 8600587 | 1/1986 | PCT Int'l Appl. | 280/5.26 |
| 463235 | 3/1937 | United Kingdom | 280/5.26 |

*Primary Examiner*—Brian L. Johnson
*Attorney, Agent, or Firm*—Michael J. Striker

[57] ABSTRACT

A stair climbing device, such as a wheelchair for handicapped comprises a frame having two sides, two wheel pairs each arranged on a respective one of the sides of the frame, each of the wheel pairs having two wheels each provided with a rim and a center axis, two drive shafts provided for each wheel pair, the drive shafts extending parallel to one another and to the center axis and being driven jointly, the wheels of each of the wheel pairs being turnable relative to the frame about the drive shafts, each of the drive shafts being provided with a hub disc with which it is eccentrically connected, the rim of each of the wheels being concentrically and rotatably supported on a a respective one of the hub discs.

11 Claims, 10 Drawing Sheets

STAIRS CLIMBING DEVICE

BACKGROUND OF THE INVENTION

The present invention relates to a stair climbing device, for example of a wheelchair for handicapped. More particularly, it relates to a stair climbing device which is driven by an electric motor and has a frame with two pairs of wheels turnable parallel to respective shafts.

Such a stair climbing device is disclosed, for example, in the German document DD-A-144 896 in connection with a pushcart. It has the disadvantage that both wheels of each wheel pair are rigidly connected with one another, so that during movement of this rigid structure a great supporting point extension is produced which endangers the operational safety.

SUMMARY OF THE INVENTION

Accordingly, it is an object of the present invention to provide such a sturdy climbing device which has a small structural form and can provide a high climbing efficiency with motor efficiency remaining the same, so that it is also suitable for wheelchairs for handicapped individuals.

In keeping with these objects and with others which will become apparent hereinafter, one feature of the present invention resides, briefly stated, in a stair climbing device in which both wheels of each wheel pair are turnable about individual shafts which are arranged parallel at a distance from one another and are driven jointly, and each drive shaft is eccentrically connected with a hub disc formed so that a rim of the wheel is concentrically and rotatably supported on the hub disc.

It is advantageous when the distance between the axes of the drive shafts supported in the frame is at least approximately equal to the double distance of the axis of rotation of the rim of one wheel from its associated drive shaft.

When the frame moves on a stair step, because of the eccentric turning of the hub discs of both wheel pairs, one wheel of each wheel pair is turned upwardly and placed on the stair step, while the second wheel is further turned upwardly. The frame which rests on the first wheels of both wheel pairs can move further to the next stair step, while the second wheel of the wheel pairs is turned up to the next stair step, so that after this frame rests on the second wheels of the wheel pairs. Additional supporting wheels on the frame in the region of the existing wheels are no longer necessary.

A uniform development of the climbing process can be achieved in accordance with the present invention when the drive shafts are coupled via a joint drive chain with a rotation-reversible electric motor in the same direction, and the hub disc of one wheel of one wheel pair is connected with its associated drive shaft so that it is offset relative to the hub disc of the other wheel by a peripheral angle of 180°.

In stair climbing devices for wheelchairs, the rim of the wheels of both wheel pairs can be supported on the axial wheel disc through a roller bearing-directional lock and thereby move in one running direction with closed brake, namely rearwardly during stairs climbing. Thereby a reverse movement to the next step is possible despite the braked rim. In addition, the rim of the wheels can be fixable by means of a braking device, for example a braking device which is electromagnetically actuated and coupled with an automatically acting control device. The braking device can prevent a further running of the wheels, without interrupting their turning movement or stroke movement. During climbing over a stair, a wheel pair can also be fixed on the stair edge by means of the braking device, while the hub discs (eccentric) of the wheel pair perform a turning movement for placing on the next step. Advantageously, the rim of the wheel can be supported through a bearing sleeve on a central pin of the hub disc, so that bearing sleeve supports a chain wheel, a shaft pin is concentrically rotatably supported inside the associated drive shaft and supports a similar chain wheel, and both chain wheels can be coupled through an endless chain to form a chain drive with a transmission ratio 1:1. The electromagnetic braking device can be arranged either on the shaft pins, or in the interior of the rim of the wheels.

During a non braking movement of a wheelchair, a brake disc of the braking device rotates because of the rotation of the rim with the same number of revolutions as the wheel. In the braking position by means of the braking disc, the rim is blocked either directly or through the chain drive in one direction, and the wheel is fixed on its periphery. The stroke movement of the transporting wheel through the eccentrically supported hub disc is thereby not influenced. Because of the 1:1 transmission ratio of the chain drive, the rim remains braked. Because of the roller bearing-directional lock the action of the braking device on a traveling direction can be limited.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
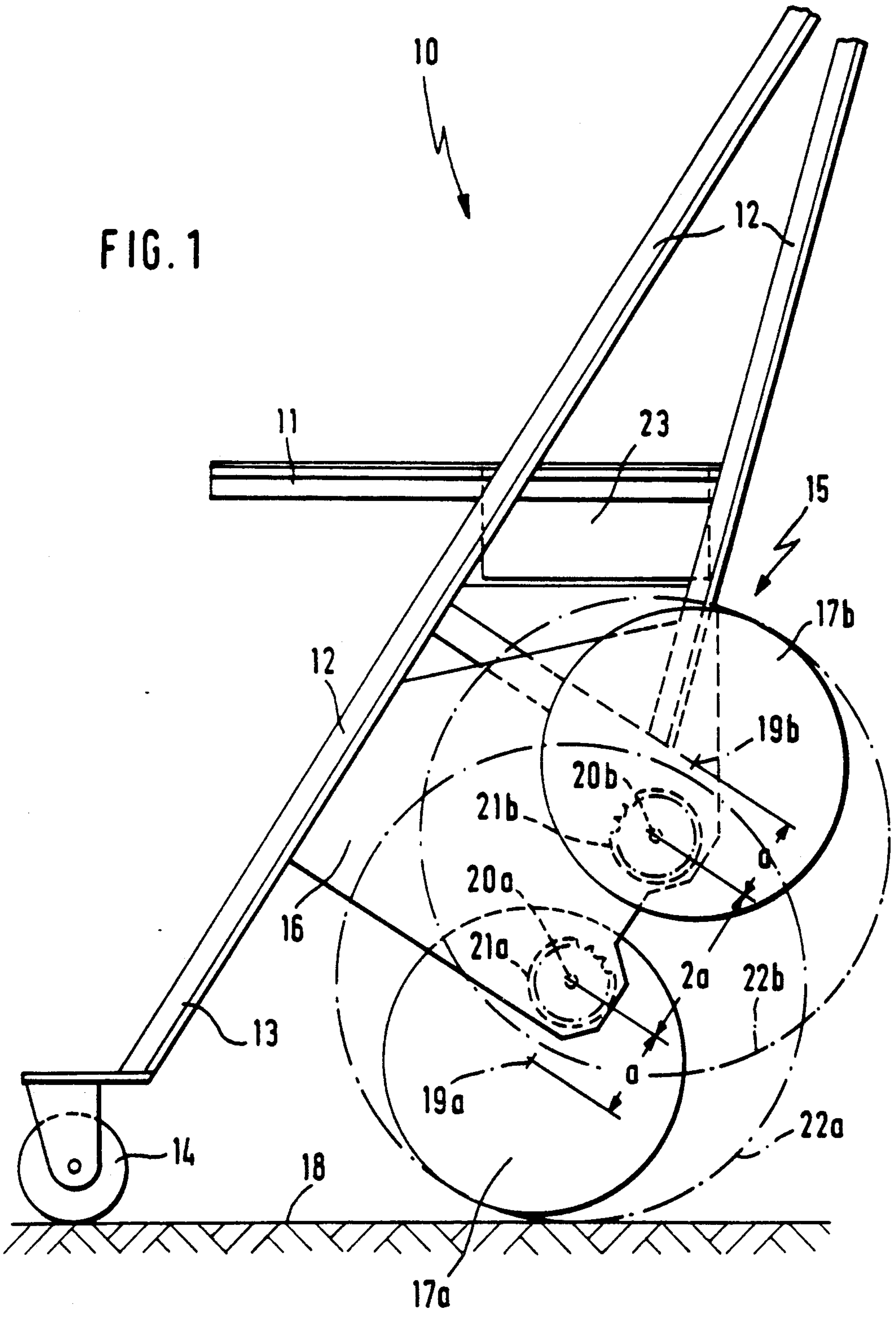
FIG. 1 is a schematic partial side view of a wheelchair with a wheel pair of a stair climbing device in accordance with the present invention.
Figure 2:
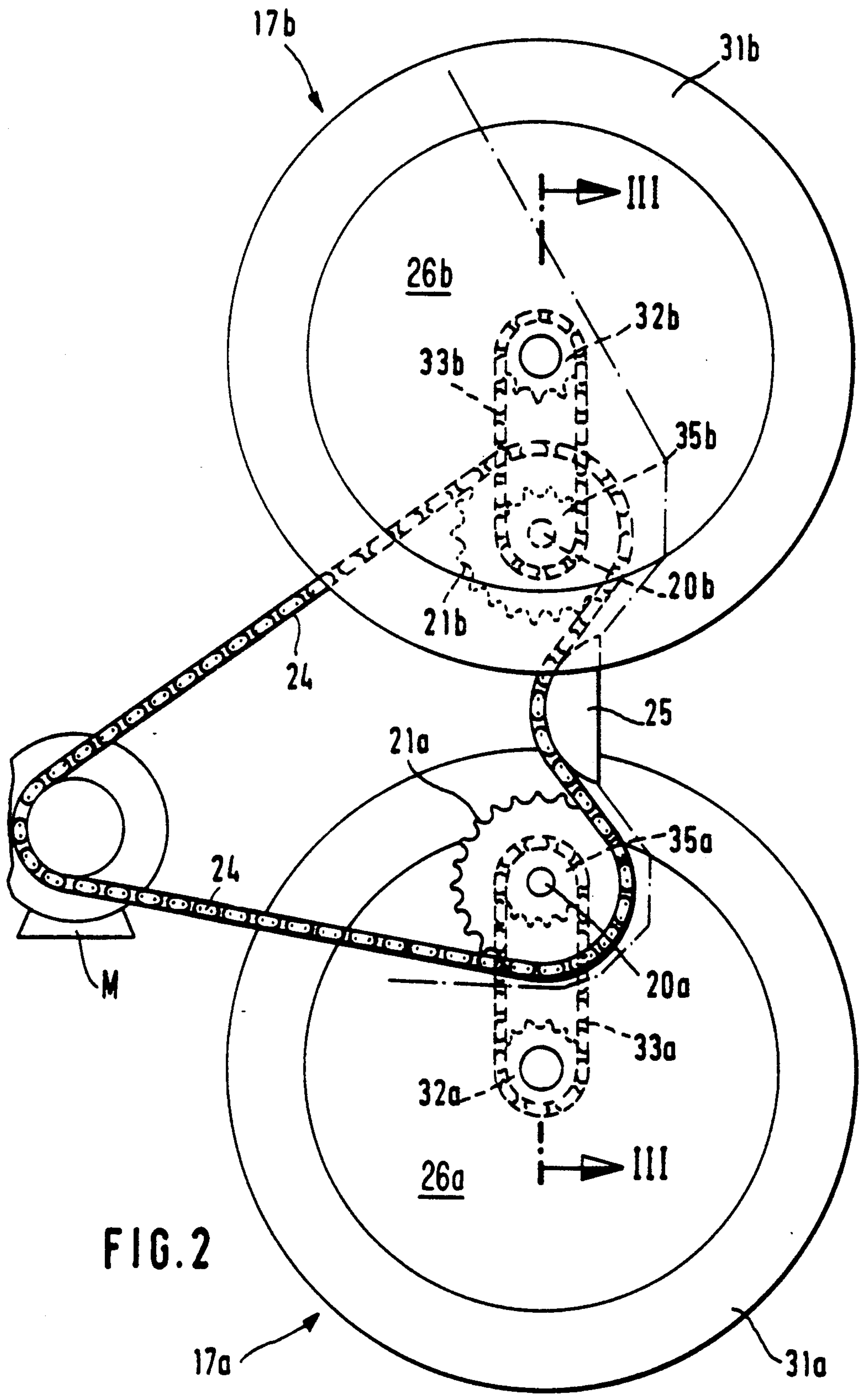
FIG. 2 is a schematic side view of the wheel pair with drive connections.
Figure 3:
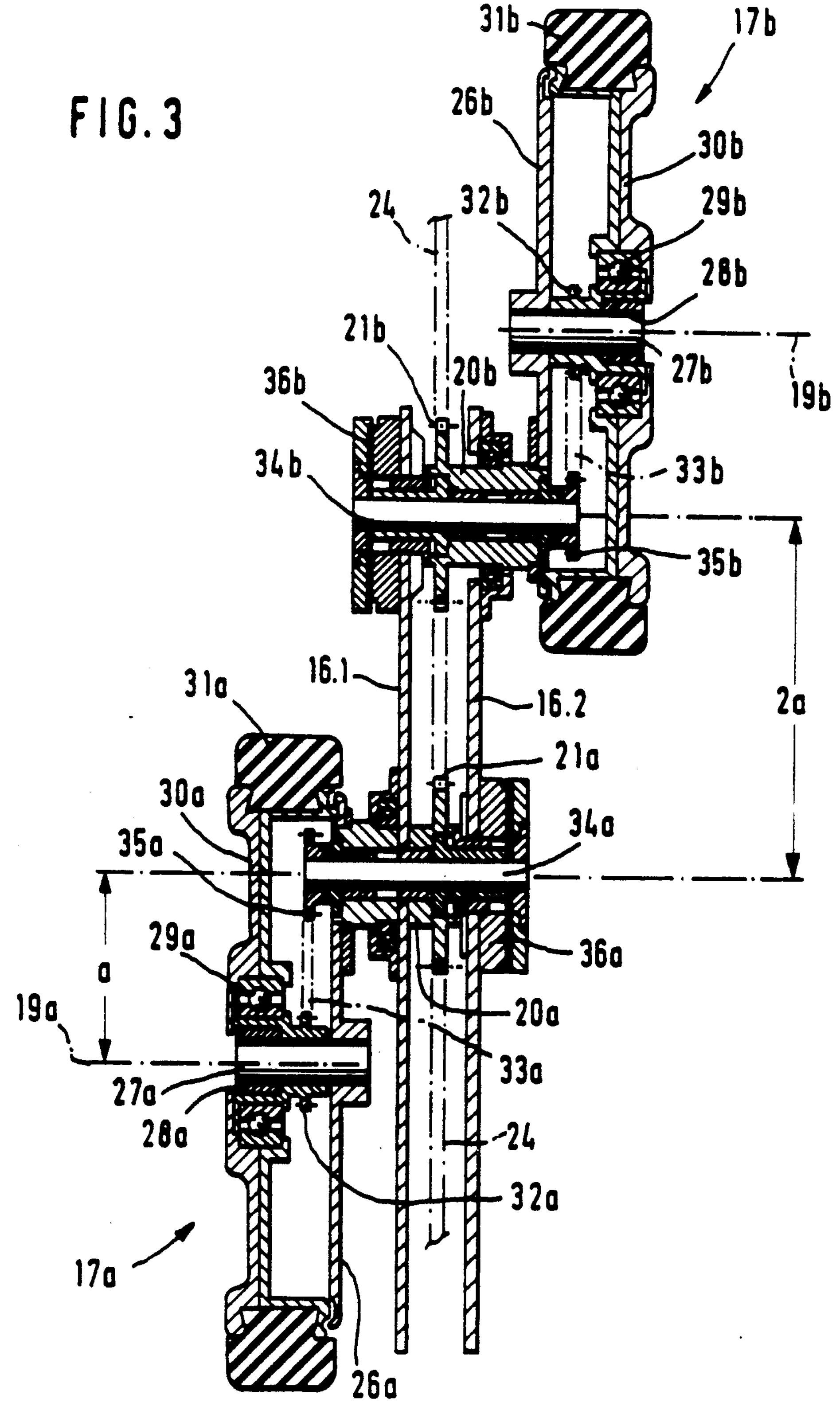
FIG. 3 is a view showing a section taken along the line III—III in FIG. 2 through the wheel pair, on an enlarged scale.

FIG. 1 shows a wheelchair 10 for people who are unable to walk. The wheelchair has a seat frame 11 which is connected with a chair frame 12. The chair frame 12 has at front two foot bars 13 each rotatably supporting a caster wheel 14. On the side view of FIG. 1 only the left caster wheel 14 is shown. A supporting frame for a stair climbing device 15 is mounted on the chair frame 12. It has a left supporting plate 16 and an identical right supporting plate 16 on a not shown right side of the wheelchair 10. A pair of wheels 17a and 17b are arranged on each supporting plate 16, one of which runs on a track 18 in the normal or immovable position of the stairs climbing device 15 shown in FIGS. 1 and 4. The construction of wheel pair 17a, 17b and the opposite arrangement of both wheels 17a and 17b as well as their drive are shown in FIGS. 2 and 3. FIG. 1 shows the center points 19a and 19b of both wheels 17a and 17b and drive shafts 20a and 20b arranged eccentrically to them and supported in the supporting plate 16. The drive shafts 20a 20b are associated with drive chain wheels 21a and 21b. Moreover, enveloping circles 22a and 22b are shown in dash-dot lines and describe the periphery of the wheels 17a and 17b during their movement about the eccentric drive shaft 20a and 20b. The distance between both drive shafts 20a and 20b amounts to 2a or the double the value of the distance a of the center point 19a or 19b of the wheel 17a or 17b to the axis of its eccentric drive shaft 20a or 20b.

The electric drive motor m actuates the stair climbing device. FIG. 1 shows a box 23 under the seat frame 11 for accommodation of batteries for operating an electric drive motor which is coupled with an electric control device. The electric drive motor moves an endless chain 24 which is guided over both chain wheels 21a and 21b of both drive shafts 20a and 20b for obtaining a rotary movement of both drive shafts 20a and 20b in the same direction and with the same speed. The joint driving chain 24 runs between both chain wheels 21a and 21b over a sliding body 25 which can be replaced by a deviating chain wheel. It is to be understood that on the right side of the wheelchair 10, a similar wheel pair is arranged and driven exactly the same way.

FIG. 3 shows that the supporting plate 16 is composed of two parallel plate walls 16.1 and 16.2 which are spaced from one another so that the joint drive chain 24 which is identified with a dash-dot line is guided between them. Also, the chain wheels 21a and 21b are arranged between them. These chain wheels are mounted on the drive shafts 20a and 20b which are supported in the supporting plates 16.1 and 16.2.

FIG. 3 also illustrates the construction of the wheels and a braking device which acts upon the wheels. Each of the two identical wheels 17a and 17b of a wheel pair has a hub disc 26a, 26b which is connected with the eccentric drive shaft 20a, 20b and has a central axle pin 27a, 27b. A bearing sleeve 28a, 28b is fitted on the axle pin 27a, 27b and carries a roller bearing-directional lock 29a, 29b. The latter supports a rim 30a, 30b which ends in a rubber tire 31a, 31b. The bearing sleeve 28a, 28b is provided with a chain wheels 32a, 32b which is coupled via an endless chain 33a, 33b shown in FIG. 2 with a chain wheel 35a, 35b which is mounted coaxially with the associated hollow drive shaft 20a, 20b on a shaft pin 34a, 34b which is concentrically supported in the drive shaft. The shaft pin 34a, 34b is connected in a manner with the braking disc of an electromagnetically actuated braking device 36a, 36b.

Both chain wheels 32a, 32b and 35a, 35b have the same size so that they form a chain drive with the transmission ratio 1:1. When the electromagnetic braking device 36a, 36b is activated through a not shown control device, the shaft pin 34a, 34b is braked, which means that also the bearing sleeve 28a, 28b is braked so that the roller bearing-direction lock 29a, 29b allows a rotation of the rim 30a, 30b of the respective wheel 17a, 17b only in one direction. The respective wheel 17a, 17b is braked in the direction of rotation. By the drive of the chain 24 and thereby actuated rotation of the drive shafts 20a, 20b, the hub disc 26a, 26b which is connected fixedly with the drive shaft 20a, 20b and thereby also the rim 30a, 30b of the wheel 17a and 17b is turned to move the stair climbing device upwardly or downwardly in dependence upon the used rotary direction of the drive motor for the chain 24. During the stroke movement of a wheel, the rim remains braked because of the selected transmission ratio 1:1 of the chain drive.

FIGS. 2 and 3 show that the hub disc 26b of one wheel 17b of the wheel pairs 17a/17b is connected with the associated drive shafts so that it is offset relative to the hub disc 26a of the other wheel 17a by an angle 180°.

Figure 4:
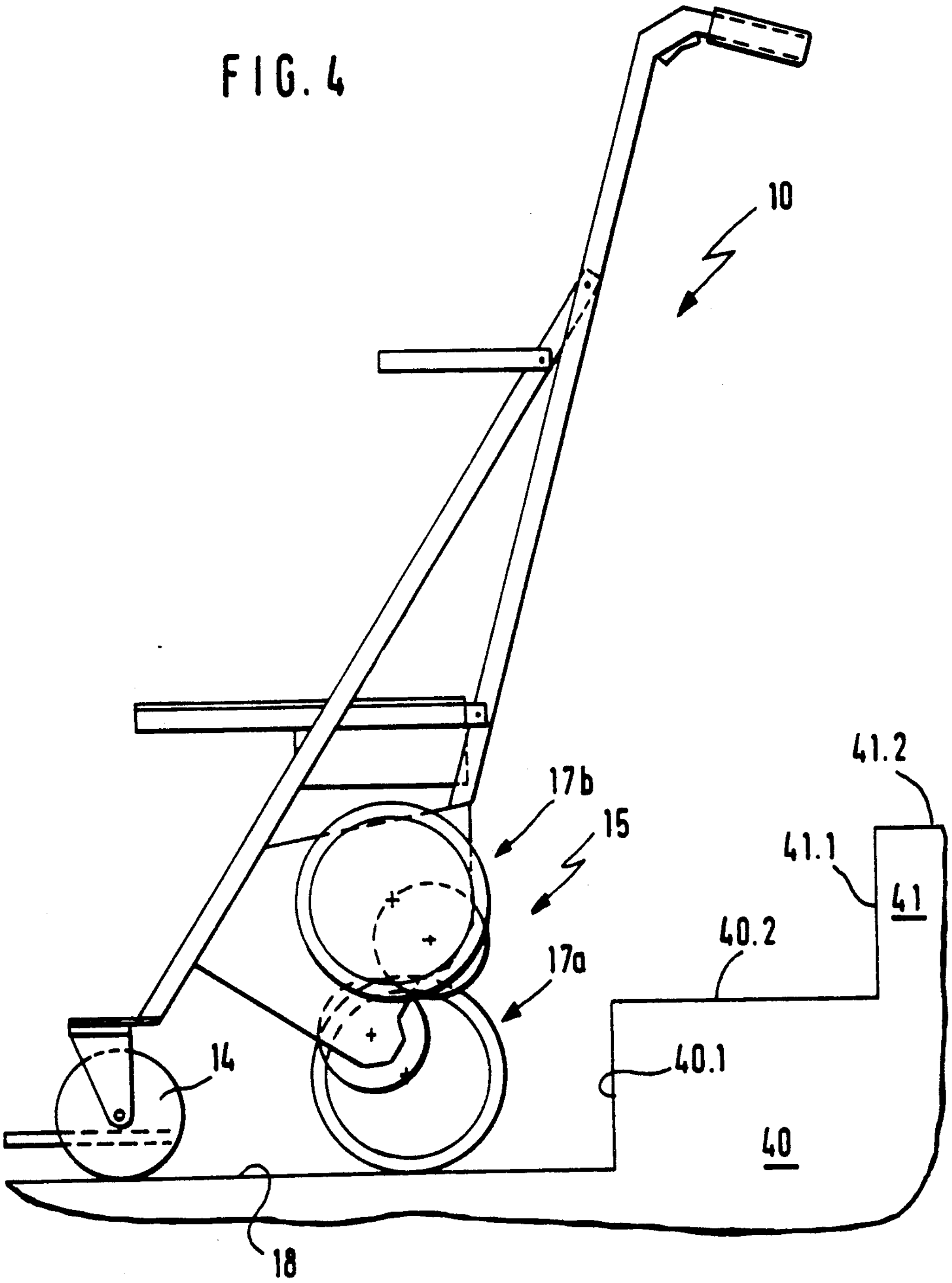
FIG. 4 is a scematic side view of a wheel chair with the inventive stair climbing device in its normal traveling or placed position.
Figure 5:
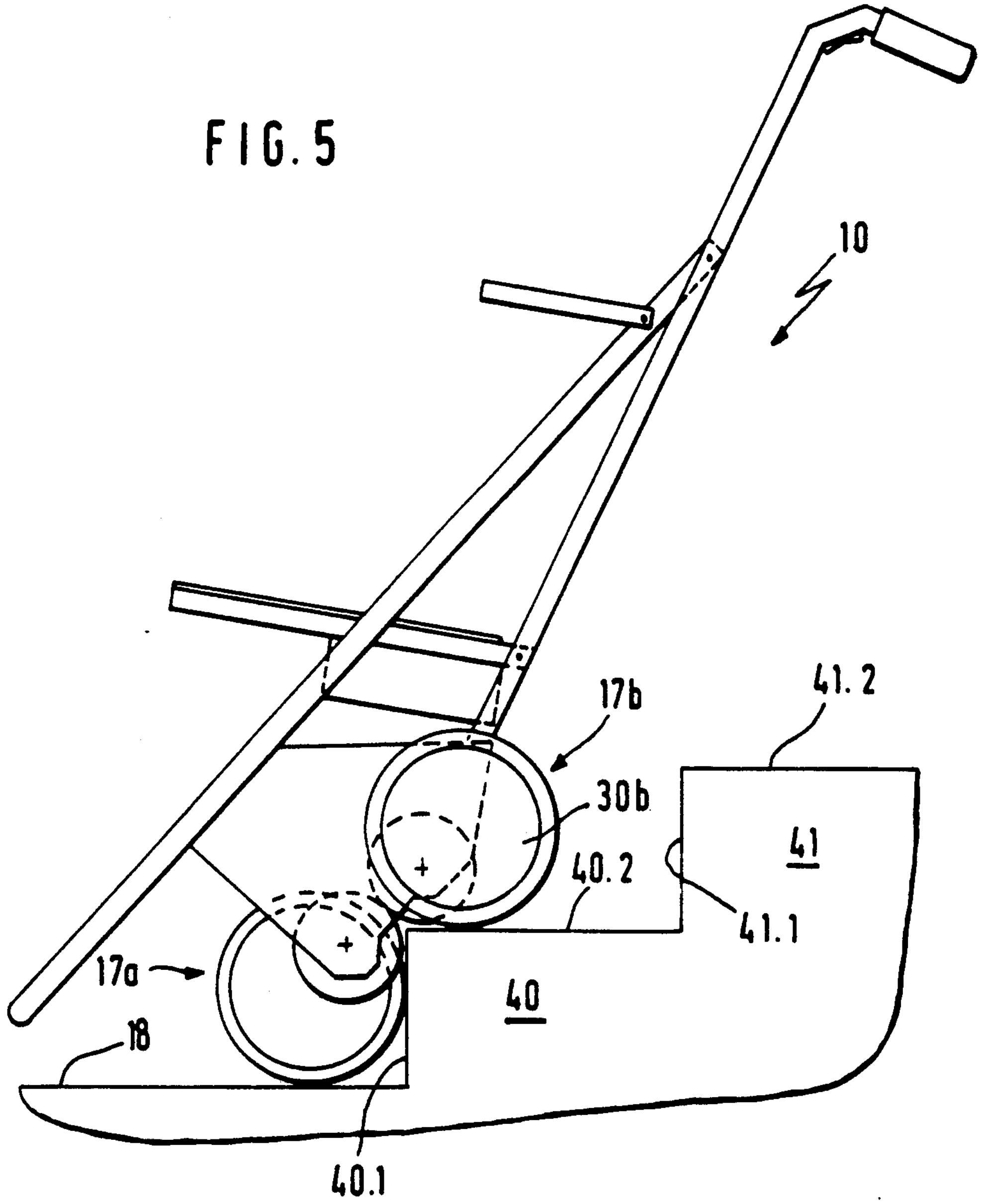
FIGS. 5–8 are views showing the wheelchair in four different positions of its stair climbing device during stairs climbing.
Figure 6:
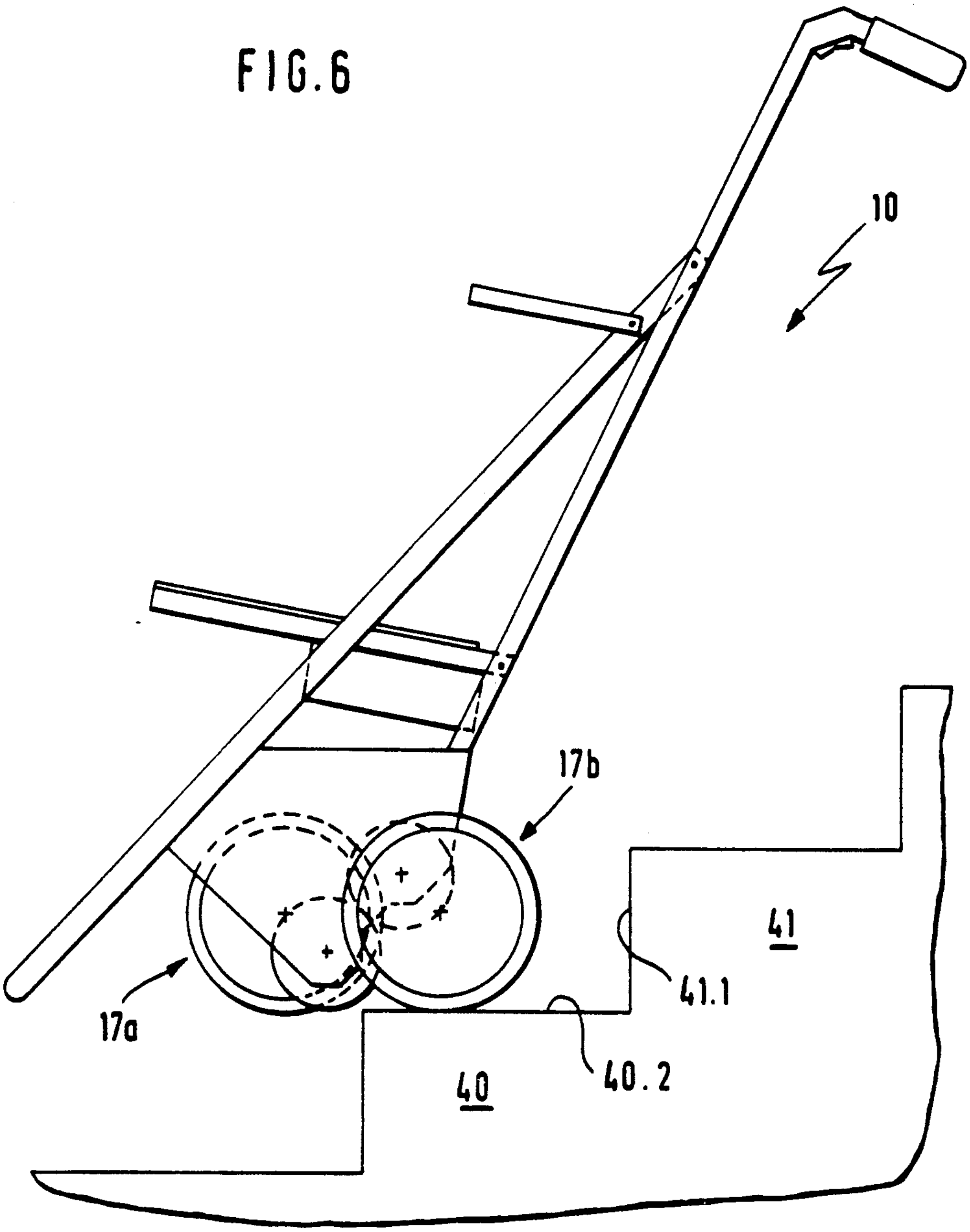
Figure 7:
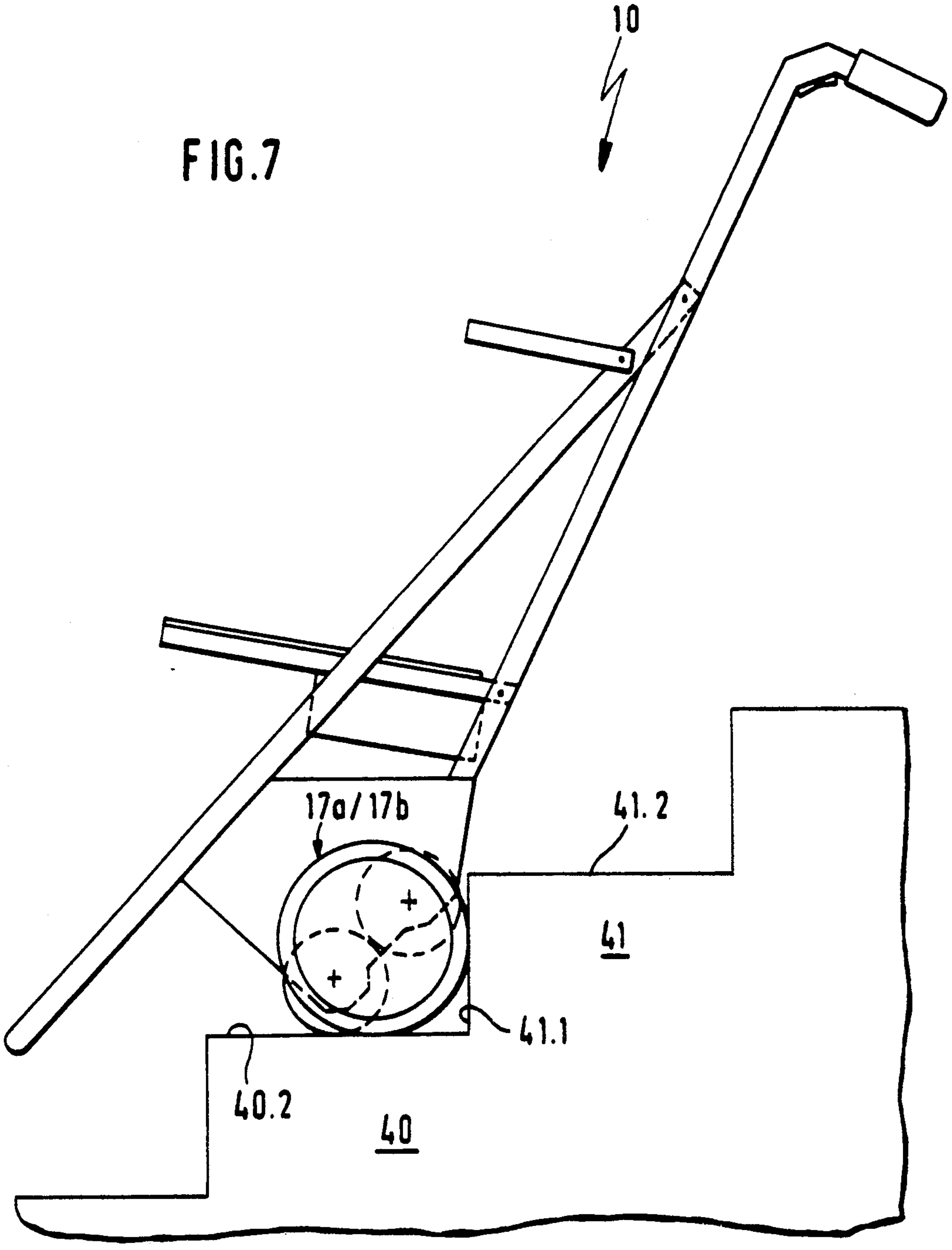
Figure 8:
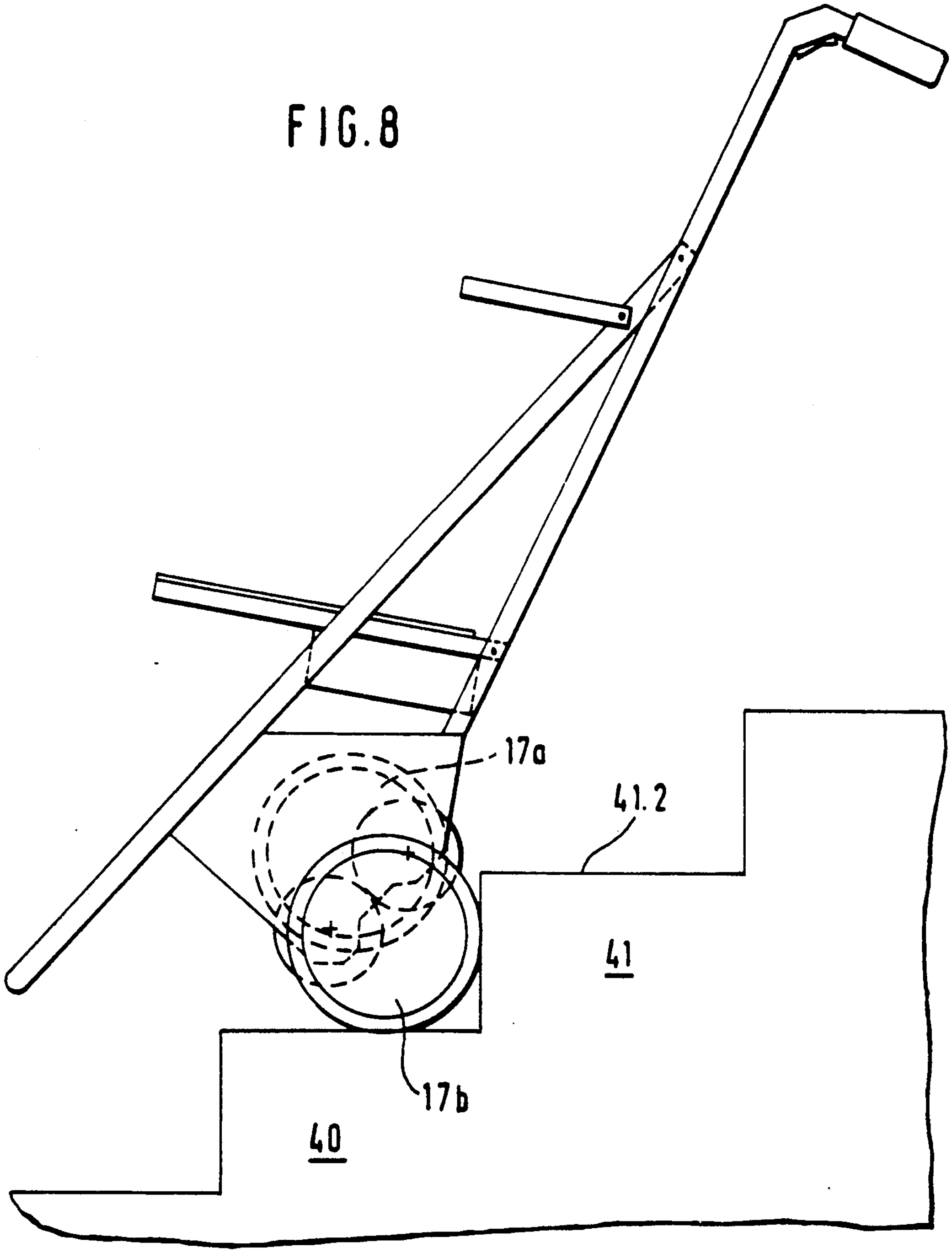

FIGS. 4–8 show the movement of the wheel pair of the stair climbing device during climbing upstairs. The Figures show the wheelchair 10 on a side view and therefore only one of the wheel pairs of the stairs climbing device 15. FIG. 4 shows the wheelchair 10 in a normal traveling position in which both wheels 17a and 17b of both wheel pairs are arranged one under the other and the wheel 17a lies on the surface 18. In this position the wheelchair can move freely with the immovable chain 24 and without activated brake. In this normal running position the wheelchair 10 is moved rearwardly against a front edge 40.1 of the first step 40, the brake is actuated, and then the drive motor for the chain of the stair climbing device 15 is switched on. Thereby, the wheel 17b with the rim 30b blocked in the forward direction is moved on the upper side of the first step 40 as shown in FIG. 5. The wheelchair 10 is supported now on the wheels 17b, while during further operation of the stair climbing device the wheel 17a is turned upwardly as shown in FIG. 6. The wheelchair can roll because of the roller bearing-directional lock 29a, on the wheels 17b to a front edge 41.1 of a next step 41. During further movement of the stair climbing device, both wheels 17a and 17b of both wheel pairs reach the coaxial position shown in FIG. 7, from which the wheel 17a is turned upwardly as shown in FIG. 8 until it reaches a step surface 41.2 of the second step 41, analogously to the position of FIG. 5. This process is repeated, and the wheel 17b always is lifted onto the next step, while the wheel 17a then follows.

Figure 9:
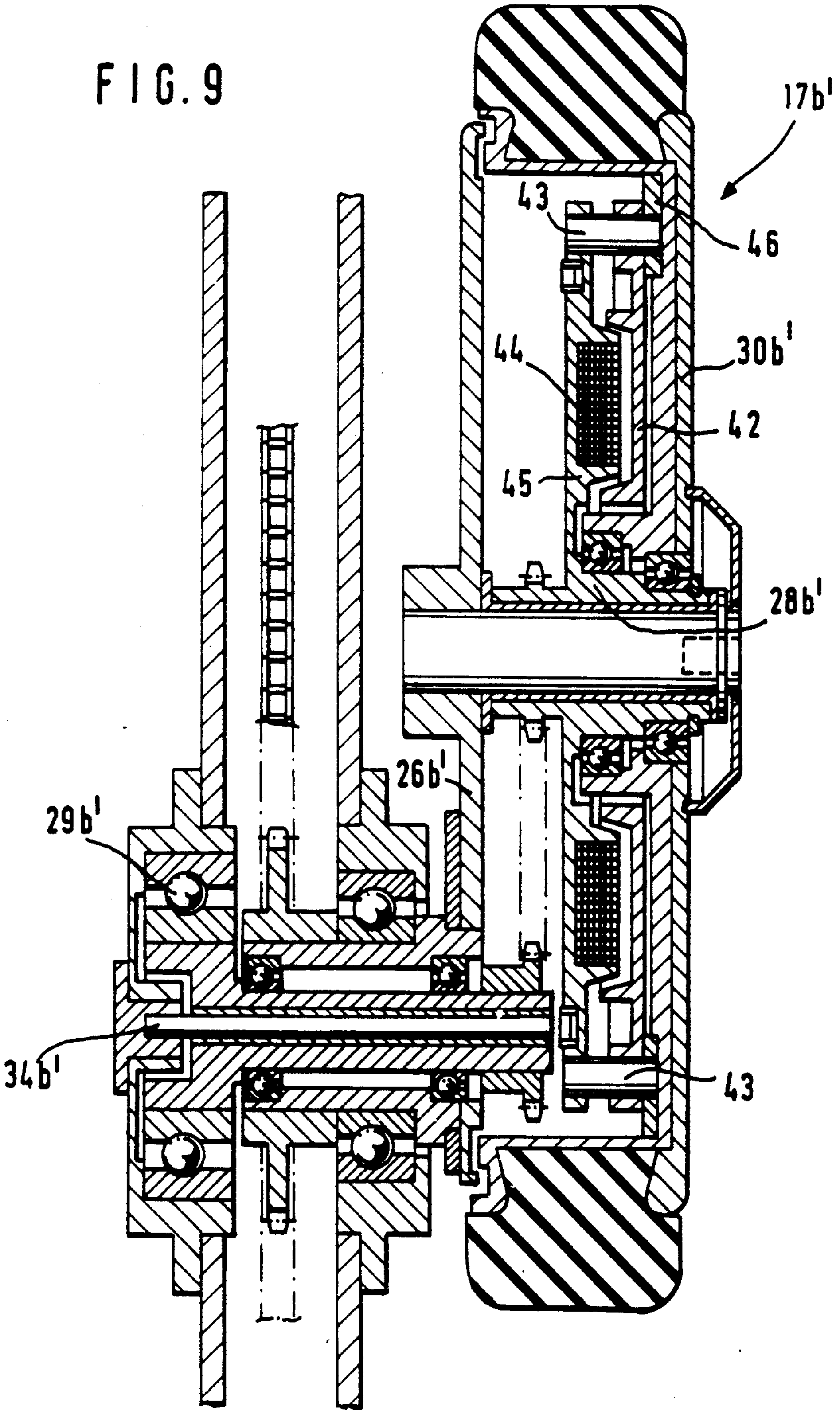
FIG. 9 is a partial side view corresponding to the view of FIG. 3 through one wheel of one wheel pair in accordance with a second embodiment.

FIG. 9 shows a central longitudinal section through a wheel 17b' of a stair climbing device in which the electromagnetic braking device is arranged on a hub disc 26b'. Thereby, a great braking surface is obtained, An anchoring disc 42 which is connected with a rim 30b' is pre-loaded by springs in the braking device, in which a locking pin 43 mounted on it engages in a perforated ring 46 which is mounted on the rim 30b', so that in the event of current failure the braking device is automatically activated. For releasing the brake a magnetic winding 44 is energized and releases the brake. The magnetic winding 44 is arranged on a counter disc 45 which is fixedly connected with a bearing sleeve 28b'. A roller bearing-direction lock 29b' is arranged here on a shaft pin 34b''.

Figure 10:
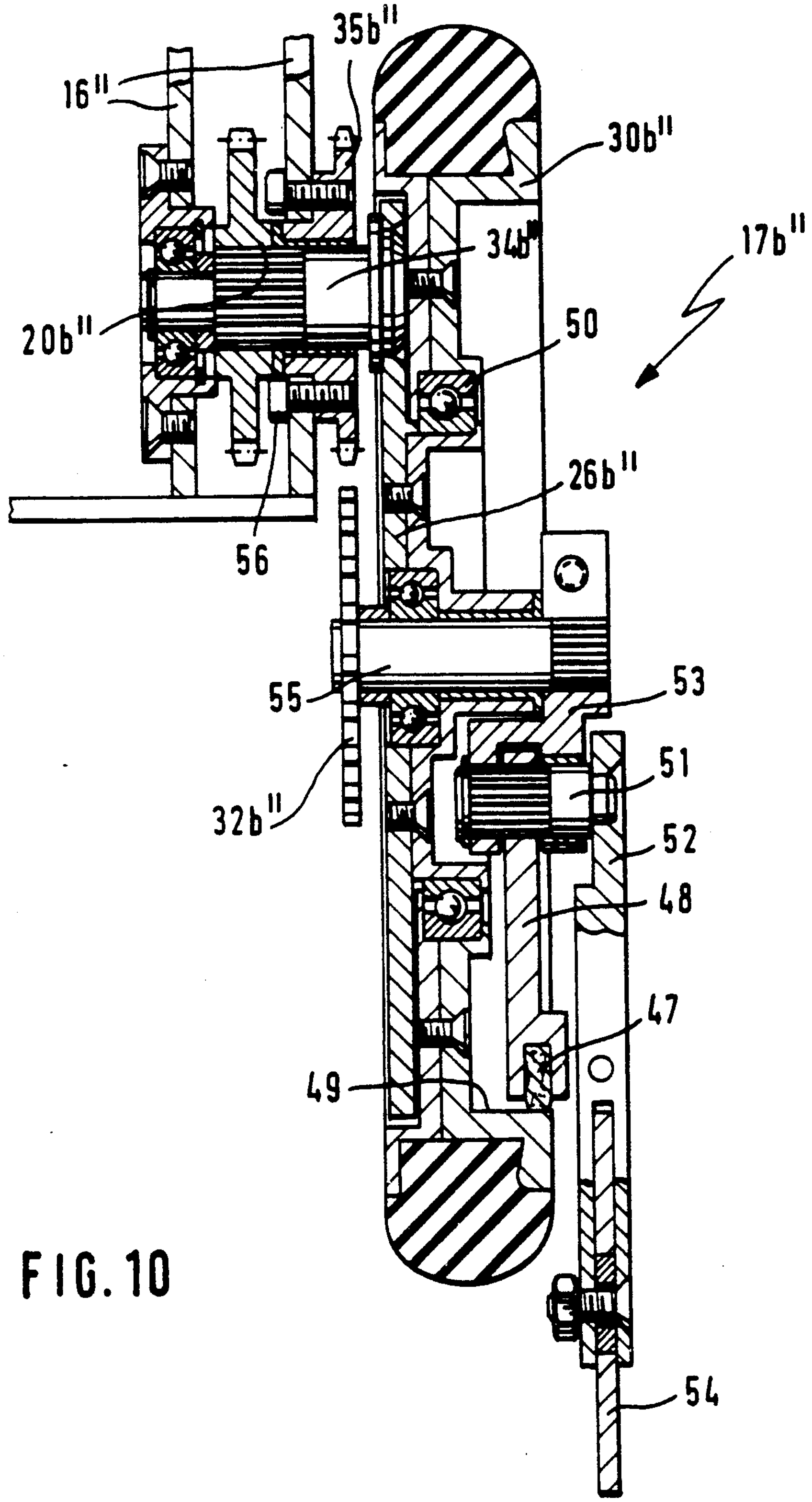
FIG. 10 is a view showing a section corresponding to the view of FIG. 9 through a wheel of a wheel pair, in accordance with a third embodiment of the invention.

FIG. 10 shows a central longitudinal portion corresponding to FIG. 9 of a wheel 17b'' of a stair climbing device which is provided with a mechanical braking device.

The braking is performed by a braking jaw 47, which is formed on the end of a turning lever 48 and acts on a drum surface 49 of a rim 30*b*″. The rim 30*b*″ is freely rotatably supported on a hub disc 26*b*″ through a ball bearing 50. The turning lever 48 with the braking jaw 47 is mounted on an axle 51 which supports a further turning arm 52 and is freely rotatably supported in a support 43. A key disc 54 is freely rotatably supported on the free end of another turning arm 52 and extends outwardly beyond the periphery of the rim 30*b*″. A support 53 is fixedly mounted with a shaft part 55 which is coaxially arranged in the hub disc 26*b*″ and freely rotates over it. The support 55 also carries a chain wheel 32*b*″, through which the support 53 of the braking device is coupled with the support frame 16″ of the stair climbing device.

The chain wheel 32*b*″ is connected through a not shown chain with a chain wheel 35*b*″. The latter is arranged concentrically to the drive shaft pin 34*b*″. which is connected with the hub disc 26*b*″. However, it is connected fixedly with the support frame 16″ by screws 56.

The key disc 54 lies normally on the same running surface on which the rim 30*b*″ rests and the key disc 54 leads the wheel 17*b*″. When the wheel 17*b*″ reaches a step edge, the key disc 54 falls over the step edge. Thereby the braking jaw 47 arranged on the turning lever 47 which is connected rigidly with the turning lever 52 brakes the rim 30*b*″ of the wheel 17*b*″, so that the wheelchair cannot move over a stair edge. The turning arm 48 with the braking jaw 47 is located during the engaged braking jaw in an inclined position and thereby acts only in a rotary direction-dependent manner. When the wheelchair moves back, the brake releases automatically.

It will be understood that each of the elements described above, or two or more together, may also find a useful application in other types of constructions differing from the types described above.

While the invention has been illustrated and described as embodied in a stair climbing device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A stair climbing device, comprising a frame having two sides; two wheel pairs each arranged on a respective one of said sides of said frame, a first wheel and a second wheel of said wheel pair each being provided with a rim and a center axis; a first and a second drive shaft provided for said wheel pairs; and first and second hub discs eccentrically connected with said first and said second drive shaft, respectively, said center axis being supported concentrically and rotatably in said first or said second hub disc, respectively, said first drive shaft being mounted in said frame at a distance from an end parallel to said second drive shaft, said second hub disc being eccentrically connected with said second drive shaft and is peripherally offset with respect to said first hub disc eccentrically connected with said first drive shaft, said first and second drive shafts for said two wheels of said wheel pair being connected so that they are driven with a same speed in a same direction; and driving means for driving said first and second drive shafts with the same speed and in the same direction.

2. A stair climbing device as defined in claim 1, wherein each of said drive shafts has a shaft axis and each of said rims has an axis of rotation coinciding with said center axis of a respective one of said wheels and spaced from said shaft axis of an associated drive shaft by a predetermined distance, said axes of said drive shafts being spaced from one another by a distance which is at least approximately equal to twice said predetermined distance.

3. A stair climbing device as defined in claim 1 where said means for driving both said drive shafts including an electric motor with a reversible direction of rotation and a joint drive chain through which said electric motor drives said drive shafts in the same directions.

4. A stair climbing device as defined in claim 1, wherein said said hub disc is offset relative to said second hub disc by a peripheral angle of 180°.

5. A stair climbing device as defined in claim 1, wherein each of said wheels is provided with a first chain wheel which rotates coaxially with said wheel, each of said drive shafts being provided with a second chain wheel rotatable coaxially with said drive shaft; and further comprising an endless chain connecting said first chain wheel of each of said wheels with said second chain wheel of an associated drive shaft with a transmission ratio of 1:1.

6. A stair climbing device as defined in claim 1; and further comprising a chain drive connected each of said wheels with a respective one of said drive shafts with a transmission ratio 1:1; and a chain wheel arranged coaxially with a respective one of said drive shafts for said chain drive.

7. A stair climbing device as defined in claim 1; and further comprising braking means arranged so that said rim of each of said wheels can be restrained by said braking means.

8. A stair climbing device as defined in claim 1, wherein each of said drive shafts is hollow and provided with an inwardly arranged and concentrically rotatable shaft pin and a chain wheel mounted on said shaft pin; and further comprising a chain drive connecting each of said wheels with an associated drive shaft with a ratio of 1:1 and having a chain running over a respective one of said chain wheels; and braking means mounted on said frame and having a braking disc connected with a respective one of said shaft pins.

9. A stair climbing device as defined in claim 1; and further comprising a chain drive connecting each of said wheels with a respective one of said drive shafts, and having a chain wheel arranged coaxially with each of said wheels and a chain running over said chain wheel; and braking means including a braking member rotatable together with said chain wheel, and two turning arms rigidly connected with one another and supported on said braking member, one of said turning arms carrying a braking jaw which acts on said rim of a respective one of said wheels in a direction of rotation-dependent manner, the other of said turning arms carring a freely rotatable key disc which extends outwardly beyond a periphery of said rim.

10. A stair climbing device, comprising a frame having two sides; two wheel pairs each arranged on a respective one of said sides of said frame at a distance from one another, each of said wheel pairs having two wheels each provided with a rim and a center axis; two drive shafts provided for each wheel pair, said drive shafts extending parallel to one another and to said center axis and being driven jointly, said wheels of each of said wheel pairs being turnable relative to said frame about said drive shafts, each of said drive shafts being eccentrically connected with a hub disc, said rim of each of said wheels being concentrically and rotatably supported on a respective one of said eccentrically connected hub discs, such that said eccentric connection of said hub discs of both wheel pairs allows said frame to move on a stair step whereby one wheel of each wheel pair is turned upwardly and placed on the stair step while another wheel of each wheel pair is further turned upwardly and said frame which rests on said one wheel of both wheel pairs can move further to a next stair step, while the other wheel of said wheel pairs is turned up to the next stair step, whereby said frame rests on the other wheels of said wheel pairs, each of said wheels being provided with a first chain wheel which rotates coaxially with said wheel, each of said drive shafts being provided with a second chain wheel rotatable coaxially with said drive shaft; and an endless chain connecting said they chain wheel of each of said wheels with said second chain wheel of its associated drive shaft with a transmission ratio of 1:1.

11. A stair climbing device as defined in claim 10; and further comprising a braking member which acts upon said rim of each of said wheels and is connected through said first chain wheel with said frame.

* * * * *